United States Patent Office 3,006,129
Patented Oct. 31, 1961

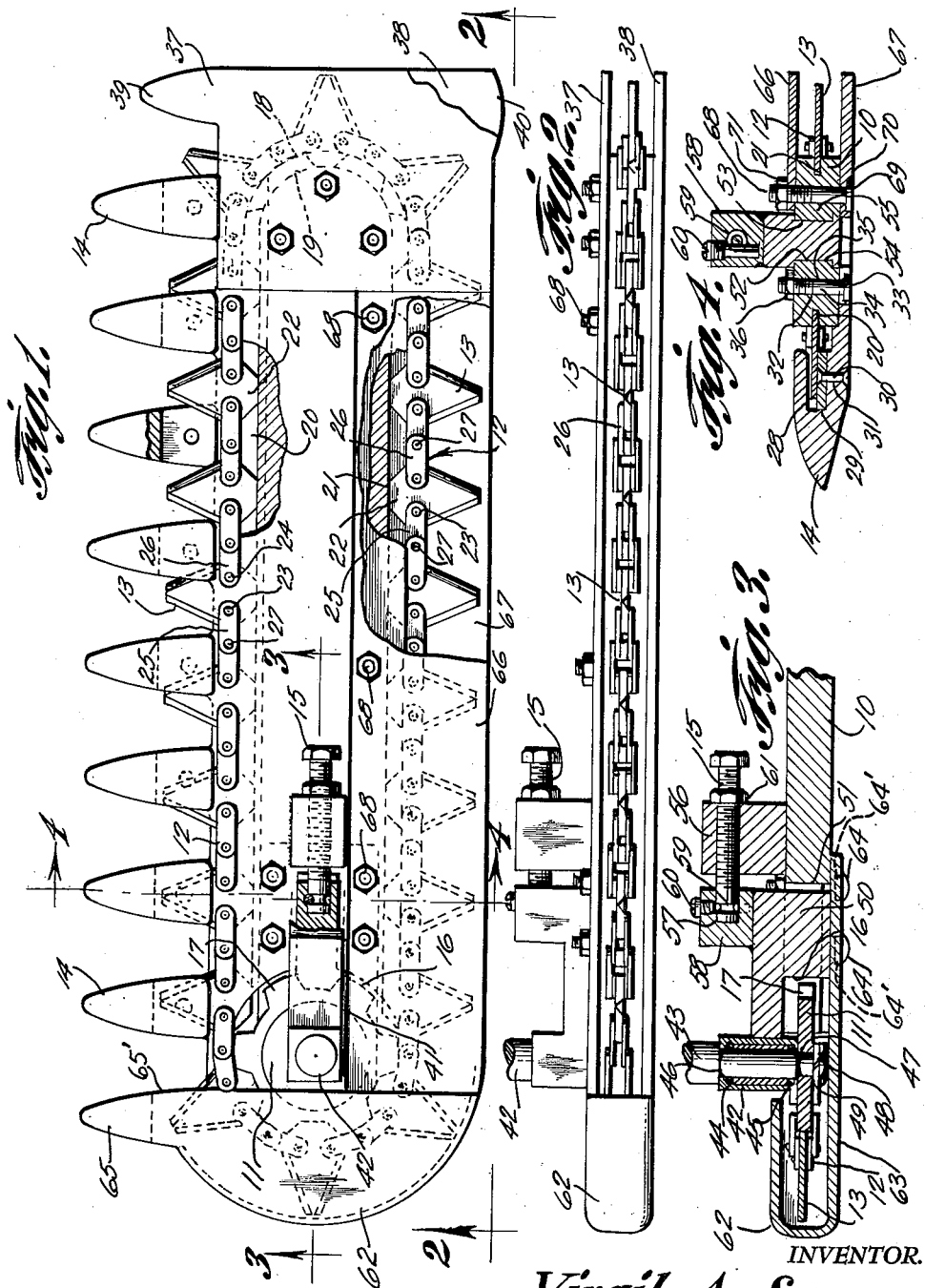

3,006,129
ENDLESS MOWER
Virgil Asbury Sayre, 399 S. Ogden Ave., Columbus, Ohio
Filed Aug. 12, 1959, Ser. No. 833,329
3 Claims. (Cl. 56—292)

This invention relates to power mowers that are to be operated by power take-off units having variable speed transmissions incorporated therewith and the power mowers are of the type having cutting blades slidably mounted on a cutter or sickle bar and wherein the blades slide through openings in fingers or guards extended forwardly from the cutter bar, and in particular a plurality of cutter blades mounted on an endless chain and positioned to slide through openings in guards, and wherein the direction of travel of the chain is reversible by reason of the transmission on the power unit so that as cutting edges of the blades wear or become dull on one of the sides thereof the chain is reversed whereby new or sharp cutting edges on opposite sides of the blades are presented for cutting. Power take-off units of the type previously described wherein a gear box including variable speed gears and a reverse mechanism are included therewith are old and well-known in the art and may be of either of the types shown in Patents No. 1,802,419, granted April 28, 1931, No. 2,302,515, granted November 17, 1942, and No. 2,323,753, granted July 6, 1943, or No. 2,441,798, granted May 18, 1948. However, since such power take-off units form no part of the present invention it is believed that the inclusion of a disclosed structure to indicate such a power take-off is not required by statutes, wherein the structure included is old and well known in the analogous fields of endeavor.

The purpose of this invention is to provide a cutter bar for a power mower in which cutting blades are mounted on an endless chain in which the direction of travel of the chain is reversible.

Cutting blades of cutter bars are substantially V-shaped and with the blades operating with a reciprocating action both edges of the blades are used for cutting. However, with the cutting blades mounted on an endless chain only one of the cutting edges of the blades is used. With this thought in mind this invention contemplates a mower blade having cutting blades carried by an endless chain in which the direction of travel of the chain is reversible.

The object of this invention is, therefore, to provide a mower having cutting blades carried by an endless chain mounted on a bar wherein the chain is so mounted that the direction of travel thereof is readily reversed.

Another object of the invention is to provide a power mower blade having V-shaped cutting blades carried by an endless chain mounted on an elongated bar in which means is provided for taking up slack in the chain.

A further object of the invention is to provide a cutter bar having cutting blades carried by a reversible endless chain in which the cutter bar is of a simple and economical construction.

With these and other objects and advantages in view the invention embodies an elongated bar having a semi-circular end and having continuous grooves in the edges and extended around the semi-circular end, a sprocket rotatably mounted in the end of the bar opposite to the end on which the semi-circular surface is positioned, a chain trained over the sprocket and extended around the bar, substantially V-shaped cutter blades carried by the chain and having base portions extended into the grooves of the bar, spaced guards extended from the leading side of the bar and having openings through which the blades pass, means mounted on the bar for taking up slack in the chain, and a shaft on which the sprocket is mounted and by which the sprocket is rotated to operate the chain.

Other features and advantages of the invention will appear from the following description taken in connection with the drawing, wherein:

FIGURE 1 is a plan view of the cutter bar with part of a cover plate on the trailing edge of the bar broken away, and with parts in section, to show the cutter blades.

FIGURE 2 is a rear elevational view of the cutter bar taken on line 2—2 of FIGURE 1.

FIGURE 3 is a longitudinal section through the end of the cutter bar in which a sprocket is positioned taken on line 3—3 of FIGURE 1, and with the parts shown on an enlarged scale.

FIGURE 4 is a cross section through the cutter bar taken on line 4—4 of FIGURE 1.

Referring now to the drawing wherein like reference characters designate corresponding parts the improved reversible chain mower of this invention includes an elongated bar or plate 10, a sprocket 11, an endless chain 12 trained over the sprocket and around the bar, cutter blades 13 carried by the chain, guards 14 mounted on the bar and extended over the chain and cutter blades, and a take-up or chain adjusting screw 15.

One end of the bar 10 is provided with an arcuate concave surface 16 that nests around the teeth 17 of the sprocket 11, as shown in FIGURE 3, and the opposite end is provided with an arcuate convex or semi-circular surface 18 in which a groove 19 is positioned. The groove 19 is in registering relation with grooves 20 and 21 in the edges of the bar, and, as shown in FIGURE 1, the grooves are positioned to receive base portions or tongues 22 of the cutter blades 13. The cutter blades 13 are pivotally connected by pins 23 and 24 to links 25 and 26 of the chain 12, and the links are pivotally connected between the blades by pins 27.

The cutter blades 13 are positioned to slide through openings 28 in the guards 14, and the lower portions of the guards are provided with shear plates 29. The shear plates are secured in the guards by rivets 30, the ends of which are positioned in counter-sunk ends of openings 31. The guards are secured to the bar 10 by bolts 32 having heads 33 in counter-sunk ends 34 of openings 35. The opposite ends of the bolts are provided with nuts 36.

The extended end of the bar 10 is provided with an upper side plate 37 and a lower side plate 38, and the upper and lower side plates are positioned to cover the cutter blades, as the blades pass around the end of the bar. The leading edges of the side plates are provided with end guards 39, and the trailing edges are provided with arcuate extending portions 40.

The end of the bar 10 in which the concave surface 16 is positioned is provided with an arm 41 having a hub 42 on the extended end, and a shaft 43 on which the mower unit is suspended is rotatably mounted in the hub by bearings 44 and 45. The shaft is provided with an upper shoulder 46 that rests on the bearing 44, and a lower shoulder 47 against which the sprocket 11 is clamped by a lock nut 48 and a spring washer 49.

The arm 41 is provided with a tongue 50 that is slidably mounted in a slot 51 in the end of the bar 10, and, as shown in FIGURE 4, the sides of the tongue are provided with recesses 52 and 53 into which projections 54 and 55 of the bar 10 extend. By this means the tongue is free to slide longitudinally with the arm 41 when it is desired to adjust tension in the chain.

The adjusting screw 15 is threaded in a lug 56 extended upwardly from the bar 10, and an end of the screw which is beyond the threads, is positioned in an opening 57 in a block 58 on the arm 41. The unthreaded end of the screw is provided with an annular recess 59 and a screw 60 threaded in the block 58 is positioned to extend through one side of the annular recess 59 whereby the block, arm, and tongue slide with the screw. Turning the screw 15, therefore, moves the sprocket 11 longitudinally of the bar providing means for taking up slack in the chain. The screw 15 is provided with a lock nut 61 for securing the chain in adjusted positions.

The mower unit is provided with a shield 62, U-shaped in cross section, having a base 63 that is secured to the under surface of the bar 10 by bolts 64, and, as shown in FIGURE 3, the U-shaped portion of the shield extends over the cutter blades traveling around the sprocket. The heads of the bolts 64 are positioned in countersunk openings 64' in the base 63 of the shield 62. The leading edge 65' of the shield is provided with a guard 65.

The cutter blades on the trailing side of the unit are covered by an upper side plate 66, as shown in FIGURES 1 and 4, and the blades are protected by a lower plate 67. The plates are secured to the bar 10 by bolts 68, heads 69 of which are positioned in counter-sunk openings 70. The upper ends of the bolts are provided with nuts 71.

Operation

With the parts assembled as illustrated and described the power shaft 43 is connected to suitable driving means having a variable transmission incorporated therewith and as the cutter blade is actuated over an area the cutter blades coact with the shear plates on the guards to cut grass, or the like. Should the cutting edges of the blades wear or become dull, the direction of rotation of the shaft by reason of the variable transmission on said driving means is reversed whereby the direction of travel of the chain is reversed and the grass or the like is cut with the opposite or sharp edges of the blades. By this means a clean swath of grass is cut and rows of uncut grass, resulting from broken teeth, do not remain in the field.

It will be understood that modifications, within the scope of the appended claims, may be made in the design and arrangement of the parts without departing from the spirit of the invention.

What is claimed is:

1. In a reversible chain mower for use with a power take-off having a variable transmission, the improvement comprising an elongated bar having grooves in the edges, a sprocket rotatably mounted on one end of the bar, a chain trained over the sprocket and extended around the bar, cutter blades carried by the chain and having tongues extended into the grooves of the bar, spaced guards extended from the leading side of the bar, said guards having openings in which the chain and cutter blades are slidably mounted, a shaft upon which the sprocket is mounted, a shield connected to one end of said bar, an arm connected to said one end of said bar, a hub on said arm for mounting said shaft therein, a tongue on said arm mounted within said shield, a block on said tongue, a lug on said one end of said bar confronting said block, means mounted in said lug and connected to said block whereby said block, tongue, arm and shaft are moved laterally of said one end of said bar to adjust the tension of said chain.

2. In a power mower blade assembly for use with a power take-off unit having a variable transmission, the improvement comprising an elongated bar having grooves in the edges, a shaft rotatably mounted on one end of the bar, a sprocket mounted on the shaft, an endless chain extended around the sprocket and bar, a lug mounted on the bar, a block mounted on that end of the bar on which the sprocket is rotatably mounted, an adjusting screw mounted in said lug and engaging said block for adjusting said chain, cutter blades carried by the chain and having tongues extended into the grooves of the bar, spaced guards extended from the leading side of the bar, said guards having openings through which the chain and blades pass, shear plates in the guards and positioned to coact with the cutter blades for cutting materials between the guards, and cover plates mounted on the bar and extended over the cutter blades on the trailing side of the bar.

3. In a chain mower, the combination which comprises an elongated bar, one end of which is semi-circular, said bar having grooves in the edges and semi-circular end, an endless chain trained around the bar and semi-circular end thereof, a shaft rotatably mounted in the end of the bar opposite to the semi-circular end, a sprocket mounted on the shaft and aligned with the grooves of the bar, the chain extending over the sprocket, a lug mounted on the bar, a block mounted on the end of the bar on which the sprocket is rotatably mounted, an adjusting screw mounted in said lug and engaging said block for adjusting said chain, the said last mentioned end of the bar having a slot therein for mounting said block, said block having recesses in the sides thereof and projections on said last mentioned end of said bar extending into said recesses for guiding the movement of said block, cutter blades carried by the chain and having tongues positioned to slide in the grooves of the bar, spaced guards mounted on the bar and having openings positioned to receive the chain and cutter blades, shear plates in the guards positioned to coact with the cutter blades, a take-up assembly included in the mounting of the shaft, and side plates extended from the ends and trailing edge of the bar providing shields for the cutter blades.

References Cited in the file of this patent
UNITED STATES PATENTS

| | | |
|---|---|---|
| 1,200,520 | Platt | Oct. 10, 1916 |
| 1,760,939 | Emerson | June 3, 1930 |
| 1,851,840 | Huff | Mar. 29, 1932 |
| 2,714,280 | Baker | Aug. 2, 1955 |
| 2,793,487 | Wofermin | May 28, 1957 |